United States Patent
Khan

(10) Patent No.: US 12,473,957 B2
(45) Date of Patent: Nov. 18, 2025

(54) ELECTRICALLY ISOLATING TUNED MASS DAMPER

(71) Applicant: HSP Hochspannungsgeräte GmbH, Troisdorf (DE)

(72) Inventor: Kamran Khan, Toronto (CA)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 447 days.

(21) Appl. No.: 17/979,555

(22) Filed: Nov. 2, 2022

(65) Prior Publication Data

US 2024/0141967 A1    May 2, 2024

(51) Int. Cl.
*F16F 7/104* (2006.01)
*H02B 1/54* (2006.01)

(52) U.S. Cl.
CPC .......... *F16F 7/104* (2013.01); *F16F 2222/04* (2013.01); *F16F 2222/12* (2013.01)

(58) Field of Classification Search
CPC .... F16F 7/104; F16F 2222/04; F16F 2222/12; H02B 5/00; H02B 1/54; E04H 9/0215
See application file for complete search history.

(56) References Cited

U.S. PATENT DOCUMENTS

| | | | | |
|---|---|---|---|---|
| 3,789,174 A * | 1/1974 | Barkan | ..................... | H02B 1/54 200/301 |
| 3,921,039 A * | 11/1975 | Robinson | ................. | H02B 1/54 248/676 |
| 3,973,078 A * | 8/1976 | Wolf | ......................... | F16F 9/19 200/301 |
| 4,277,639 A * | 7/1981 | Olsson | ..................... | H02B 1/54 248/610 |
| 4,342,067 A * | 7/1982 | Thuries | .................. | H01H 31/32 361/602 |
| 4,577,826 A * | 3/1986 | Bergstrom | .............. | F16F 15/02 174/161 R |
| 7,032,723 B2 * | 4/2006 | Quaglia | .................. | F16F 7/104 188/250 F |
| 8,692,537 B2 * | 4/2014 | Hyde | ......................... | G05F 1/14 323/361 |
| 9,995,360 B2 | 6/2018 | Khan et al. | | |
| 10,658,821 B2 * | 5/2020 | Eder | .......................... | E04B 1/98 |
| 11,255,395 B2 * | 2/2022 | Dahl | ...................... | E04H 9/0215 |
| 11,293,411 B2 * | 4/2022 | Mortensen | .............. | F03D 13/20 |

(Continued)

FOREIGN PATENT DOCUMENTS

| CN | 104790554 | 2/2017 |
|---|---|---|
| DK | 180710 B1 | 12/2021 |

(Continued)

*Primary Examiner* — Thomas W Irvin
(74) *Attorney, Agent, or Firm* — David R. Stevens; Stevens Law Group

(57) ABSTRACT

A system includes an electrical component, an insulating support structure supporting the electrical component at a first electrical potential higher than an electrical ground potential, and an insulating pendulum having a proximal end attached to the electrical component and suspended away from the electrical component to at least partially span the first electrical potential, the insulating pendulum further includes a tuned mass disposed at a distal end of the pendulum at a second electrical potential less than the first electrical potential. The system may also include a damping mechanism.

11 Claims, 1 Drawing Sheet

(56) References Cited

U.S. PATENT DOCUMENTS

| | | | | |
|---|---|---|---|---|
| 11,698,056 | B2* | 7/2023 | Guo | F03D 80/00 |
| | | | | 267/140.3 |
| 12,031,352 | B2* | 7/2024 | Hansen | E04H 9/0215 |
| 2010/0061074 | A1* | 3/2010 | Lumpkin, Jr. | H02B 1/54 |
| | | | | 361/830 |
| 2011/0012583 | A1* | 1/2011 | Hyde | H02J 3/00 |
| | | | | 323/355 |
| 2014/0262656 | A1* | 9/2014 | Song | F16F 7/116 |
| | | | | 188/378 |
| 2017/0207608 | A1* | 7/2017 | Eder | E04B 1/98 |
| 2019/0346003 | A1* | 11/2019 | Dahl | E04H 9/0215 |
| 2020/0355166 | A1* | 11/2020 | Mortensen | F03D 80/00 |
| 2022/0228393 | A1 | 7/2022 | Hansen | |

FOREIGN PATENT DOCUMENTS

| | | | |
|---|---|---|---|
| EP | 1008747 B1 | 6/2008 | |
| WO | WO-2013064167 A1 * | 5/2013 | H02B 1/54 |
| WO | 2016007982 | 1/2016 | |
| WO | 2021121565 | 6/2021 | |

\* cited by examiner

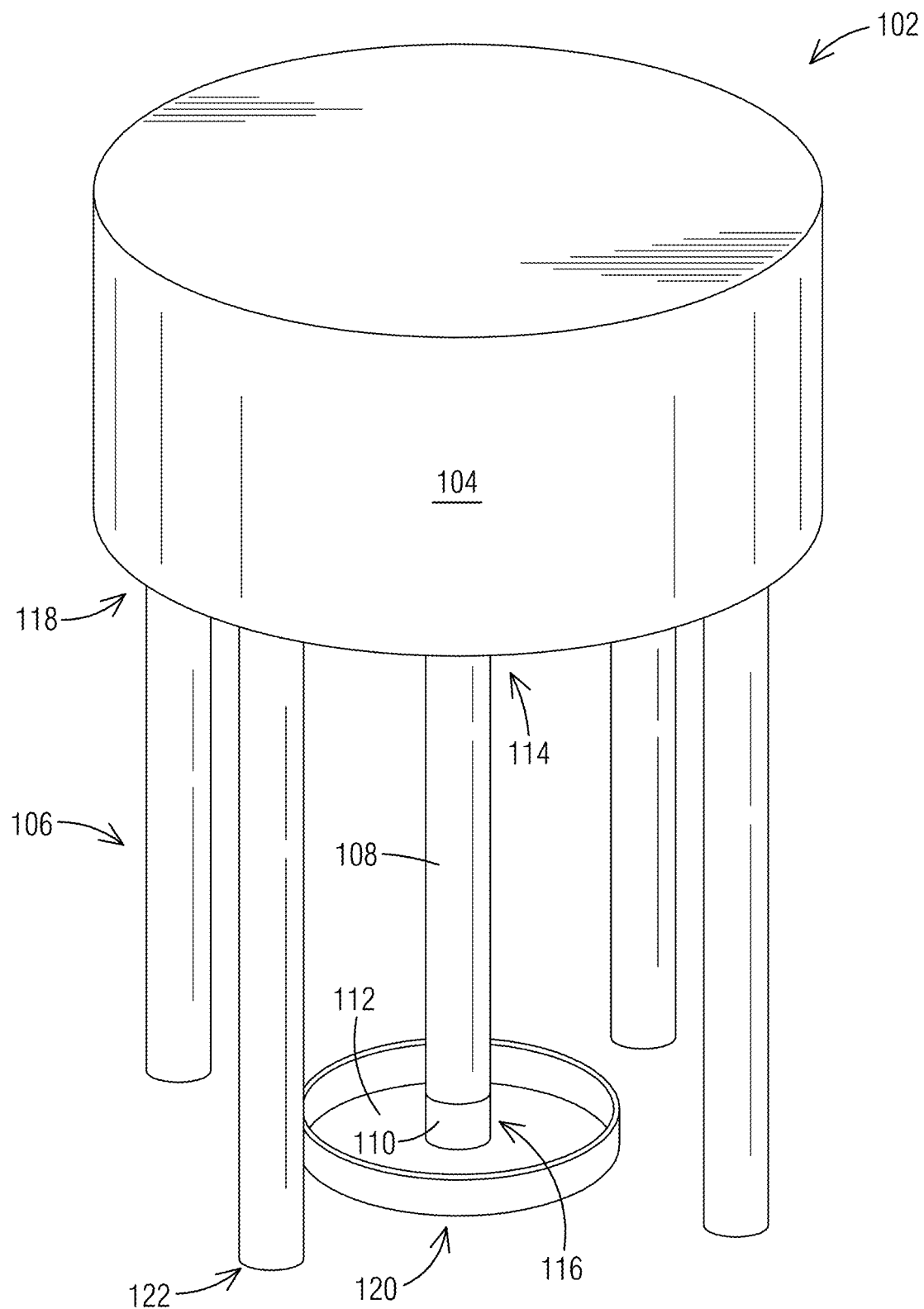

ELECTRICALLY ISOLATING TUNED MASS DAMPER

BACKGROUND

Electrical equipment installed at electrical transmission facilities may be subject to periodic lateral load demands, such as from high winds and seismic activity. There are several methods to overcome the problem of periodic lateral load demands on such electrical equipment, including, for example, using stronger insulators, using more insulators, orienting the insulators to align the resulting loads with advantageous directional properties of a particular insulator or adding a "frequency modifying" device for example, as described in IEEE Standard 693-2018.

BRIEF SUMMARY

A system includes an electrical component, an insulating support structure supporting the electrical component at a first electrical potential higher than an electrical ground potential, and an insulating pendulum having a proximal end attached to the electrical component and suspended away from the electrical component to at least partially span the first electrical potential, the insulating pendulum further includes a tuned mass disposed at a distal end of the pendulum at a second electrical potential less than the first electrical potential. The system may also include a damping mechanism.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates an aspect of the subject matter in accordance with one embodiment.

DETAILED DESCRIPTION

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act may be termed a second element, information, function, or act, and, similarly, a second element, information, function, or act may be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

To overcome the problem of periodic lateral load demands, such as external lateral accelerations caused by wind or seismic activity, on electrical equipment, the inventor has innovatively developed a tuned mass damper system for spanning an electrical potential, providing a solution that is both feasible and economical. Disposing the damping components at a ground potential simplifies the technical and economic solution. In an example embodiment, a tuned mass damper is configured such that it spans an electrical potential and thus can be configured to be used in electrical apparatus.

Electrical potential as used herein as would be readily understood in the electrical transmission power industry. Commonly, an insulator is used in the power industry to support items between different electrical potentials. These insulators, to consistently span the electrical potential, must have two primary characteristics: 1) a sufficient length such that electrical potential does not arc to electrical ground, commonly referred to as the "strike distance" or "dry arc distance" and 2) a sufficient length such that the electrical potential does not arc along the surface of the dielectric in weather or polluted environments, commonly referred to as the "creepage distance."

In terms of electrical equipment, the electrically isolated tuned mass damper provides two advantages. First it reduces periodic loading on the primary mass, for example, an electrical component, by oscillating a secondary mass, for example, a suspended tuned mass, at frequency that is similar to that of the primary mass. Secondly, it provides damping and does so in a very economic manner as the damping mechanism need not be at an electrical potential.

The electrical component may be supported by conventional insulators that meet or exceed the electrical requirements of the equipment. There may or may not be elevating pedestals below the conventional insulators. In an example embodiment, the electrical component is at an electrical potential. As such, the object must be supported by appropriate sized insulators to isolate it from electrical (and, in an embodiment, physical) ground.

Movably suspended from the electrical component is an insulated pendulum, that meets or exceeds the electrical requirements of the equipment. This may be a rigid or flexible insulator.

Attached to the insulating pendulum is a tuned mass that is selected such that, in combination with the Tuned Mass Damper Insulator, has a period of oscillation, or oscillation frequency, that is similar to that of the electrical component unto itself. For example, the tuned mass oscillation frequency should slightly lag the primary mass frequency.

The tuned mass, may or may not have provision for additional damping. Additional damping can be provided by viscous and/or frictional means. In one aspect, the damping mechanism is at ground potential.

FIG. 1 illustrates and example embodiment of a system 102 for providing an electrically isolating tuned mass damper. In one aspect, the system 102 includes an electrical component 104. In an example embodiment, the electrical component 104 may include an electrical reactor. The system 102 may also include an insulating support structure 106, such as plurality of insulating legs, supporting the electrical component 104 at a first electrical potential 118 higher than an electrical ground potential 122, and an insulating pendulum 108 having a proximal end 114 attached to the electrical component 104 and suspended away from the electrical component 104 to at least partially span the first electrical potential 118, the insulating pendulum 108 further includes a tuned mass 110 disposed at a distal end 116 of the insulating pendulum 108 at a second electrical potential 120 less than the first electrical potential. In an embodiment, the second electrical potential 120 may be the electrical ground potential 122. In an example embodiment, the tuned mass 110 may include a damping mechanism 112. In another embodiment, the damping mechanism 112 may be disposed at the electrical ground potential 122. In another aspect, the damping mechanism 112 may include at least one of a viscous damper, such as fluid dashpot or dissipative damper, a coulomb damper, such as a hanging chain, and a hysteretic damper, such as an elastomeric damper.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

LISTING OF DRAWING ELEMENTS 102 system
104 electrical component
106 insulating support structure
108 insulating pendulum
110 tuned mass
112 damping mechanism
114 proximal end
116 distal end
118 first electrical potential
120 second electrical potential
122 electrical ground potential

What is claimed is:

1. A system comprising:
an electrical component;
an insulating support structure supporting the electrical component at a first electrical potential higher than an electrical ground potential; and
an insulating pendulum having a proximal end attached to the electrical component and suspended away from the electrical component to at least partially span the first electrical potential, the insulating pendulum further comprising a tuned mass disposed at a distal end of the pendulum at a second electrical potential less than the first electrical potential, wherein the tuned mass comprises a damping mechanism.

2. The system of claim 1, wherein the damping mechanism is disposed at the electrical ground potential.

3. The system of claim 1, wherein the damping mechanism comprises a viscous damper.

4. The system of claim 3, where the viscous damper comprises at least one of a fluid dashpot and a dissipative damper.

5. The system of claim 1, wherein the damping mechanism comprises a coulomb damper.

6. The system of claim 5, wherein the coulomb damper comprises a hanging chain.

7. The system of claim 1, wherein the damping mechanism comprises a hysteretic damper.

8. The system of claim 7, wherein the hysteretic damper comprises an elastomeric damper.

9. The system of claim 1, wherein the electrical component comprises at least one of an electrical coil, an electrical reactor, and a capacitor.

10. The system of claim 1, wherein the insulating support structure comprises a plurality of insulating legs.

11. The system of claim 1, wherein the second electrical potential is the electrical ground potential.

* * * * *